(12) United States Patent
Warr et al.

(10) Patent No.: US 8,755,207 B2
(45) Date of Patent: Jun. 17, 2014

(54) COMPOSITE AC-TO-DC POWER CONVERTER USING MIDPOINT METHOD

(75) Inventors: William Warr, Glendale, CA (US); Evgeni Ganev, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 563 days.

(21) Appl. No.: 13/271,785

(22) Filed: Oct. 12, 2011

(65) Prior Publication Data
US 2013/0094257 A1 Apr. 18, 2013

(51) Int. Cl.
*H02M 7/06* (2006.01)
(52) U.S. Cl.
USPC .............................................. 363/64; 336/148
(58) Field of Classification Search
USPC ................. 363/3, 5, 44, 48, 64, 67, 125, 126; 336/148
See application file for complete search history.

(56) References Cited

U.S. PATENT DOCUMENTS

| | | | |
|---|---|---|---|
| 6,388,430 B1 | 5/2002 | Eldridge | |
| 6,396,723 B2 * | 5/2002 | Mochikawa et al. | 363/125 |
| 6,861,936 B2 * | 3/2005 | Kamath | 336/148 |
| 6,995,993 B2 | 2/2006 | Sarlioglu | |
| 7,813,147 B2 | 10/2010 | Blanchery | |
| 2004/0202012 A1 | 10/2004 | Ferens | |
| 2011/0103113 A1 | 5/2011 | Ganev et al. | |

OTHER PUBLICATIONS

Kamath, Garish, et al., "A Novel Autotransformer based 18-Pulse Rectifier Circuit", Proc. IEEE Appl. Power Electron. Conf. Expo., 2002, pp. 795-801.
Kamath, Garish, et al. "A Compact Autotransformer based 12-Pulse Rectifier Circuit", IEEE Industrial Electronics Conference (IECON'01), Abstract, Nov. 2001.

* cited by examiner

*Primary Examiner* — Adolf Berhane
*Assistant Examiner* — Yemane Mehari
(74) *Attorney, Agent, or Firm* — Shimokaji & Associates, P.C.

(57) ABSTRACT

A 24-pulse and 18-pulse composite AC-to-DC converter is a converter using two or more conversion methods in parallel. The converter may include a main rectifier receiving at least a portion of an input AC signal, an autotransformer having an output voltage with lower amplitude than the input AC signal, and a plurality of auxiliary bridge rectifiers, each receiving the output from each leg of the autotransformer. In one embodiment of the invention, the main rectifier may receive a substantial portion of the load current, allowing each of the auxiliary bridge rectifiers to be generally smaller than the main rectifier.

9 Claims, 12 Drawing Sheets

COMPOSITE AC-TO-DC POWER CONVERTER USING MIDPOINT METHOD

BACKGROUND OF THE INVENTION

The present invention relates to apparatus and methods for an electric power alternate current (AC)-to-direct current (DC) converter employing composite technology and, more particularly, to apparatus and methods for an electric power AC-to-DC converter utilizing more than one type of conversion technology operating in parallel.

AC-to-DC converters play a significant role in the modern aerospace/military industry. This is particularly true in the area of more electric architecture (MEA) for aircraft and spacecraft.

The commercial aircraft business is moving toward MEA having no bleed-air environmental control systems (ECS), variable-frequency (VF) power distribution systems, and electrical actuation. A typical example is the Boeing 787 platform. The Airbus A350 airplane incorporates a large number of MEA elements. In the future, the next-generation Boeing airplane (replacement for the 737) and the Airbus airplane (replacement for the A320), will most likely use MEA. Some military aircraft already utilize MEA for primary and secondary flight control among other functions.

Military ground vehicles have migrated toward hybrid electric technology, where the main propulsion is performed by electric drives. Therefore, substantial demand for increased power electronics in that area has emerged. Future space vehicles will require electric power-generation systems for thrust vector and flight control actuation. These systems must be more robust and offer greatly reduced operating costs and safety compared to the existing Space Shuttle power systems.

These new aerospace and military trends have significantly increased electrical power-generation needs. The overall result has been a significant increase in the challenges to accommodate electrical equipment to the new platforms. A new set of electrical power quality and electromagnetic interference (EMI) requirements has been created to satisfy system quality and performance. The latest tendency, as a part of MEA, is the energy-efficient aircraft where electric power and heat management are inter-related. Therefore, overall system performance improvement and specifically power density increase are necessary for the new-generation hardware. This has led to increased operating voltages, and efforts to reduce system losses, weight, and volume. This particularly applies to the AC-to-DC conversion, which is a substantial contributor to the weight, volume, and cost of the power conversion electronics.

Power quality is a major concern for MEA aircraft because a large number of electric power systems and equipment are installed on the same bus. The power quality of these systems and equipment has much more stringent requirements to ensure that all power supplies/utilization equipment function properly together. For power supply equipment, additional monitoring features are implemented to detect and isolate equipment, or groups of equipment, that may experience a power quality issue. This isolation capability is to protect the other operating power supplies and utilization equipment.

For power utilization equipment, strict power quality requirements are imposed. Some reasons for the requirements are listed below:

Equipment contributing to power quality problems causes other equipment to fail.

Equipment is prevented from achieving its design performance or reliability due to the reduced power quality of the source.

Perhaps to meet a desired minimum weight, equipment designed with reduced or no power margin tends to be more susceptible to power quality issues. Also, equipment designed to minimize weight tends to create power quality issues.

Equipment can fail due to self-generated power quality problems.

Power quality requirements for AC electrical equipment consist of a large number of parameters. Some of these are listed below:

Current distortion
Inrush current
Voltage distortion
Voltage modulation
Power factor
Phase balance
DC content Current distortions composed of AC harmonics are the key design drivers for equipment. The requirements for current harmonics, subharmonics, and interharmonics specify the allowable distortion as a function of multiples of the fundamental frequency of the input voltage. A typical current harmonic spectrum of an AC to DC converter includes all odd harmonics up to 39, with limits ranging from 10 to 0.25 percent of the maximum current fundamental. The current distortion requirement is a key design driver since it usually significantly impacts the equipment weight. Current distortion also is specified as a function of the equipment-rated power because the higher power equipment has more influence on the power bus.

For AC-to-DC converters, the requirements for the DC output are also important. The requirements include ripple voltage and voltage droop. The ripple voltage and voltage droop determine the DC operating range of the output equipment such as inverters.

When converting three-phase AC to DC, the most typical method is to employ a single three-phase full-wave rectifier in which six rectifying elements are connected in a bridge configuration. In such a three-phase full-wave rectifier, DC voltage is output by changing over the rectifying elements so that they successively conduct at intervals of 60°. However, with this method, the rectified DC voltage contains a voltage ripple of large amplitude having a period of six times the power source frequency, producing harmonics.

As can be seen, there is a need for an improved AC-to-DC converter that may provide sufficient power density while not substantially adding to the weight, volume and cost of the power conversion electronics.

SUMMARY OF THE INVENTION

In one aspect of the present invention, a composite 24-pulse AC-to-DC converter comprises a main rectifier receiving at least a portion of an input AC waveform; an autotransformer comprising three sets of three phase outputs and having output voltages with lower amplitude than the input AC waveform; and a plurality of auxiliary bridge rectifiers, each receiving the output from each leg of the autotransformer, each being generally smaller than the main rectifier, wherein each output from each leg of the autotransformer is connected in parallel with an output of the main rectifier, and each leg of the autotransformer satisfies a transformer vector diagram constructed using vertices of an equilateral triangle wherein an arc swung between the vertices is equal to a length of one leg of the triangle and a number of autotransformer phase outputs is determined by a number of rays drawn from a midpoint of the equilateral triangle.

In another aspect of the present invention, a method for converting AC power to DC power with a 24-pulse AC-to-DC converter comprises passing a first portion of a load current through a main rectifier; passing a second portion of a load current though an autotransformer, the autotransformer having output voltages with lower amplitude than an input AC waveform; and rectifying the output from the autotransformer with a plurality of auxiliary bridge rectifiers, each of the auxiliary bridge rectifiers receiving the output from each leg of the autotransformer, wherein outputs of the auxiliary bridge rectifiers are connected in parallel to an output of the main rectifier, and each leg of the autotransformer satisfies a transformer vector diagram constructed using vertices of an equilateral triangle wherein an arc swung between the vertices is equal to a length of one leg of the triangle and a number of autotransformer phase outputs is determined by a number of rays drawn from a midpoint of the equilateral triangle that are equally spaced between two equilateral legs of the triangle and each ray extends from the opposite vertex to a point along the arc.

In a further aspect of the present invention, a method for reducing the total harmonic distortion (THD) of a 24-pulse AC-to-DC converter comprises passing a substantial portion of a load current through a main rectifier; passing the remaining portion of a load current though an autotransformer, the autotransformer comprising a number of phase outputs determined by a number of rays in a vector diagram comprising an equilateral triangle and an arc swung between two vertices, the rays equally spaced between two equilateral legs, each ray extending from a midpoint to a point along the arc and the autotransformer having output voltages with lower amplitude than an input AC waveform; and rectifying the output from the autotransformer with a plurality of auxiliary bridge rectifiers, each of the auxiliary bridge rectifiers receiving the output from each leg of the autotransformer, and each of the auxiliary bridge rectifiers are generally smaller than the main rectifier.

These and other features, aspects and advantages of the present invention will become better understood with reference to the following drawings, description and claims.

DETAILED DESCRIPTION OF THE INVENTION

Figure 1:
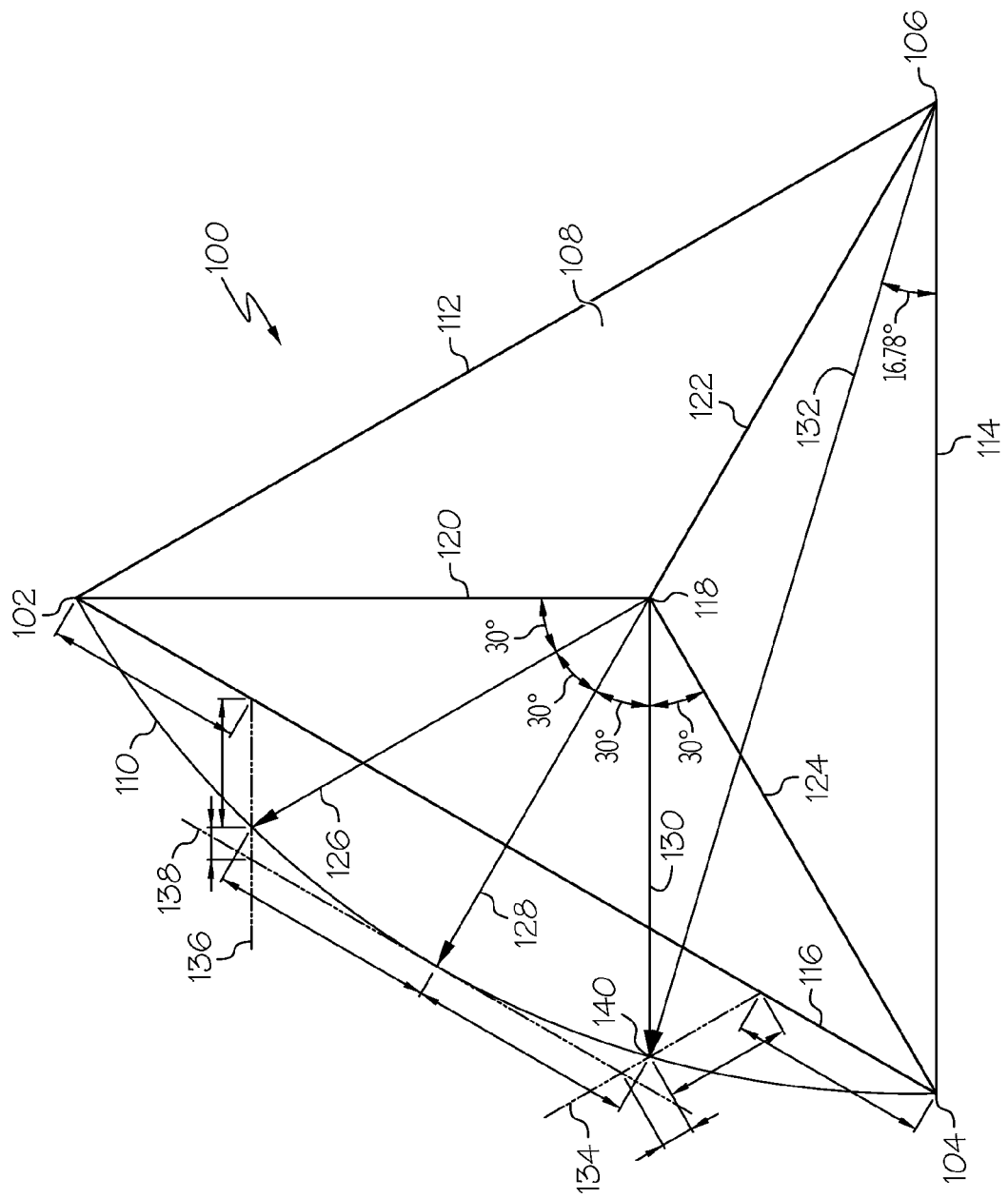
FIG. 1 is one leg of a construction diagram for the 24-pulse autotransformer according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a 24-pulse composite AC-to-DC converter. The term "composite AC-to-DC converter" has been coined to distinguish a converter using two or more conversion methods in parallel. All the autotransformers used in these composite systems may satisfy a transformer vector diagram constructed using the vertices of an equilateral-triangle and an arc swung between them equal to the length of one of the triangle's legs. The number of autotransformer phase outputs may then be determined by the number of equally spaced rays drawn from the midpoint of the equilateral triangle. The intersection points of these rays with the arc may be used to design the autotransformer's windings voltage ratios and interconnections. An autotransformer designed this way may have output voltages of lower amplitude than the voltage source, while the voltage source amplitude alone may define the system's DC output level. Because of the voltage and phase differences, the load current may split into two paths. A large portion of the load current may be rectified directly through a main rectifier bridge. The remainder of the load current may flow through the autotransformer and may be rectified by auxiliary bridge rectifiers.

The composite AC-to-DC converter according to the present invention may reduce autotransformer size and weight and should greatly improve the rectification system efficiency. In addition to reduction of size and weight, a need exists for an AC-to-DC conversion method that minimizes the AC input total harmonic distortion (THD). Six-pulse rectification schemes produce predictable harmonics as formulated in Equation 1:

$$F(h)=(k*q+/-1)*f1 \qquad (1)$$

where:
F(h) is the characteristic harmonic;
k is an integer beginning with 1;
q is an integer representing the number of commutations/cycle; and
f1 is the fundamental frequency.

The characteristic current harmonics of a six-pulse rectification system include the $5^{th}$, $7^{th}$, $11^{th}$, $13^{th}$, $17^{th}$, $19^{th}$, and $23^{rd}$ of the fundamental. These harmonics have considerable magnitude and for the six-pulse system can exceed 33 percent of the fundamental. Theory predicts that going to higher pulse rectifier systems will reduce a system's current THD. For example, a 12-pulse rectifier may have about 8.5 percent current THD (no harmonic below the 11$^{th}$), an 18-pulse rectifier may have about 3 percent current THD (no harmonic below the 17$^{th}$), and a 24-pulse rectifier may have about 1.5 percent current THD (no harmonic below the 23$^{rd}$).

Autotransformer conversion ratio (ACR) is used as means to compare different autotransformers. Equation 2 has been used as a basis of comparison of autotransformer size and weight.

$$ACR = 2*(IDC\ out * VDC\ out / \Sigma(Vrms*Irms)) \quad (2)$$

where
Vrms are the voltages at each individual winding in volt-rms values;
Irms are the currents in each individual winding in amps-rms values;
VDC out is the output rectified voltage in volts; and
IDC out is the output rectified current in amps.
The unit of the ACR is W/VA.

Using this equation a typical autotransformer used in various conventional converter designs has an ACR of 1.53 W/VA. This is the autotransformer presently used in the A350 VCRUMC and CDMMC controller designs. The estimated ACR for the smallest 18-pulse autotransformer from U.S. Pat. No. 6,396,723 is 3.53 W/VA. The estimated equivalent ACR for the 24-pulse autotransformer according to an embodiment of the present invention is 3.64 W/VA. The 24-pulse autotransformer from this estimate is potentially only 0.38 the size and weight of the autotransformer presently used in several conventional designs. The expected size and weight saving from AC to DC conversion is at least two times.

Figure 2:
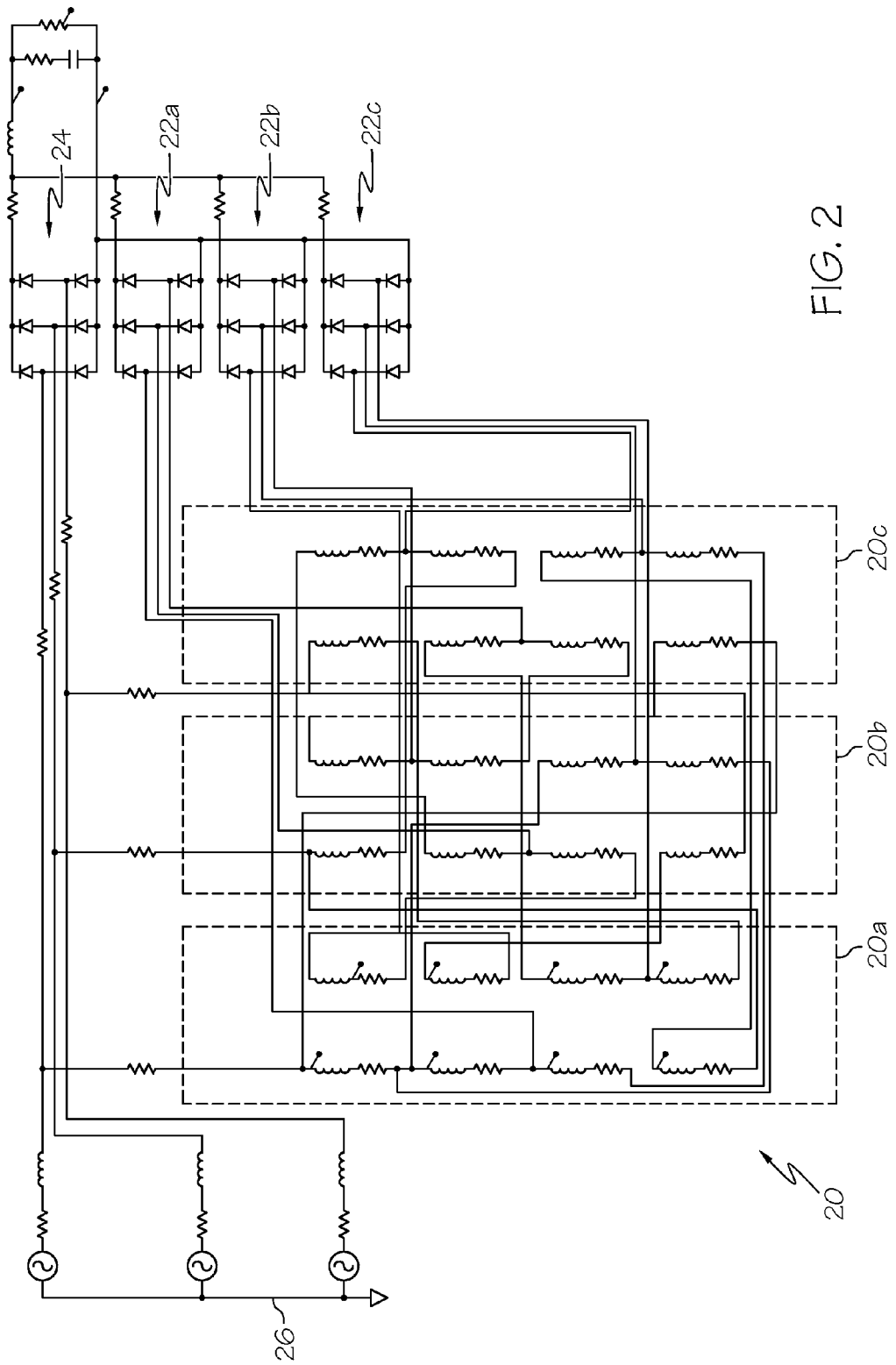
FIG. 2 is a circuit of a simulation of the 24-pulse AC-to-DC converter for a 400 Hz system according to an embodiment of the present invention, supplying a 9 kW resistive load.

Referring to FIG. 1, there is shown one leg of a construction diagram 10 for the 24-pulse autotransformer according to an embodiment of the present invention. The midpoint autotransformers used in the composite systems of the present invention satisfy a transformer diagram 100 constructed using the vertices 102, 104 and 106 of an equilateral-triangle 108 and an arc 110 swung between them equal to the length of one of the triangle's legs. A midpoint 118 of the triangle 108 may be established at a point that is an intersection of three lines 120, 122 and 124 which bisect angles at the vertices 102, 104 and 106 of the triangle 108. In the case of describing a 24 pulse autotransformer, three rays 126, 128 and 130 may be drawn connecting the midpoint 118 and the arc 110 at equally spaced angles. Since the angle between lines 120 and 124 is 120°, the rays 126, 128 and 130 may be spaced at 30° angles from one another. (For purposes of simplicity, an arc and rays are described for only one leg 116 of the triangle 108. Additional arcs and rays may be implied for the other legs 112 and 114 of the triangle 108). The intersection points of rays 126, 128 and 130 with the arc 110 may be used to design the autotransformer's windings voltage ratios and interconnections using various line segments resulting from intersections of the arc 110, the leg 116 and construction lines 134, 136 and 138 drawn parallel to the triangle's legs. Such line segments are designated with double-headed arrows in FIG. 1. An autotransformer designed this way may have output voltages of lower amplitude than the voltage source, while the voltage source amplitude alone fixes the DC output level of the system. For example, a ratio of a length of the ray 130 and a length of line 132 drawn from the midpoint 118 to an intersection point 140 may be employed to establish an autotransformer auxiliary to primary phase voltage ration of 0.7923. Because of the voltage and phase differences, the load current splits into two paths. A large portion of the load current is rectified directly through a main rectifier bridge 24 (FIG. 2). The remainder of the load current flows through the autotransformer 20 (FIG. 2) and is rectified by auxiliary bridge rectifiers 22a, 22b and 22c (FIG. 2). This composite AC-to-DC converter concept reduces autotransformer size and weight and greatly improves the system efficiency.

A simulation of this 24-pulse AC-to-DC converter for a 400 Hz system representing this configuration is shown in FIG. 2, supplying a 9 kW resistive load. The windings associated with each of the three-phase autotransformer legs are grouped within dashed-line rectangles 20a, 20b, 20c. The output from each of the autotransformer legs 20a, 20b, 20c may pass through auxiliary rectifiers 22a, 22b, 22c. As discussed above, an input AC waveform 26 may be split with a substantial portion of load current being rectified through a main 6-diode rectifier bridge 24 and the remaining portion of load current flowing through an autotransformer 20 to be rectified by the auxiliary bridge rectifiers 22a, 22b, 22c.

Figure 3:
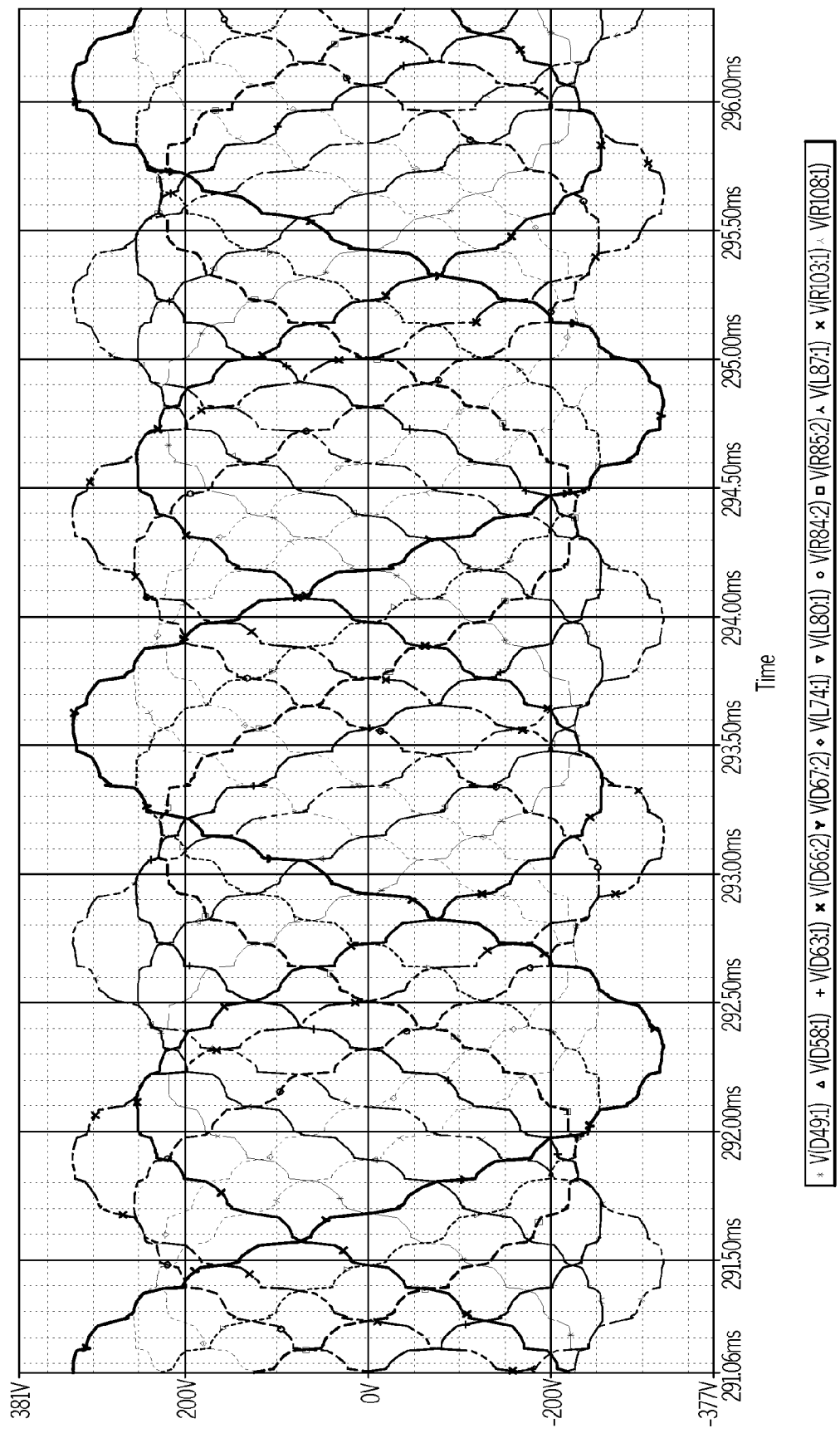
FIG. 3 is a graph of voltage waveforms when performing the simulation of FIG. 2.

Performing the simulation in PSpice yielded the waveforms and system measurements shown in FIG. 3. The voltages to the four three-phase rectifiers show the system output characteristic with reduced voltage amplitudes at the transformer (V(D34:2), V(D32:1) and V(D36:2)), when compared to the source input (V(D28:2), V(D29:2) and V(D30:2)). This voltage and phase characteristics may cause the source current to split between a main rectifier and the auxiliary rectifiers supplied by the autotransformer.

Figure 4:
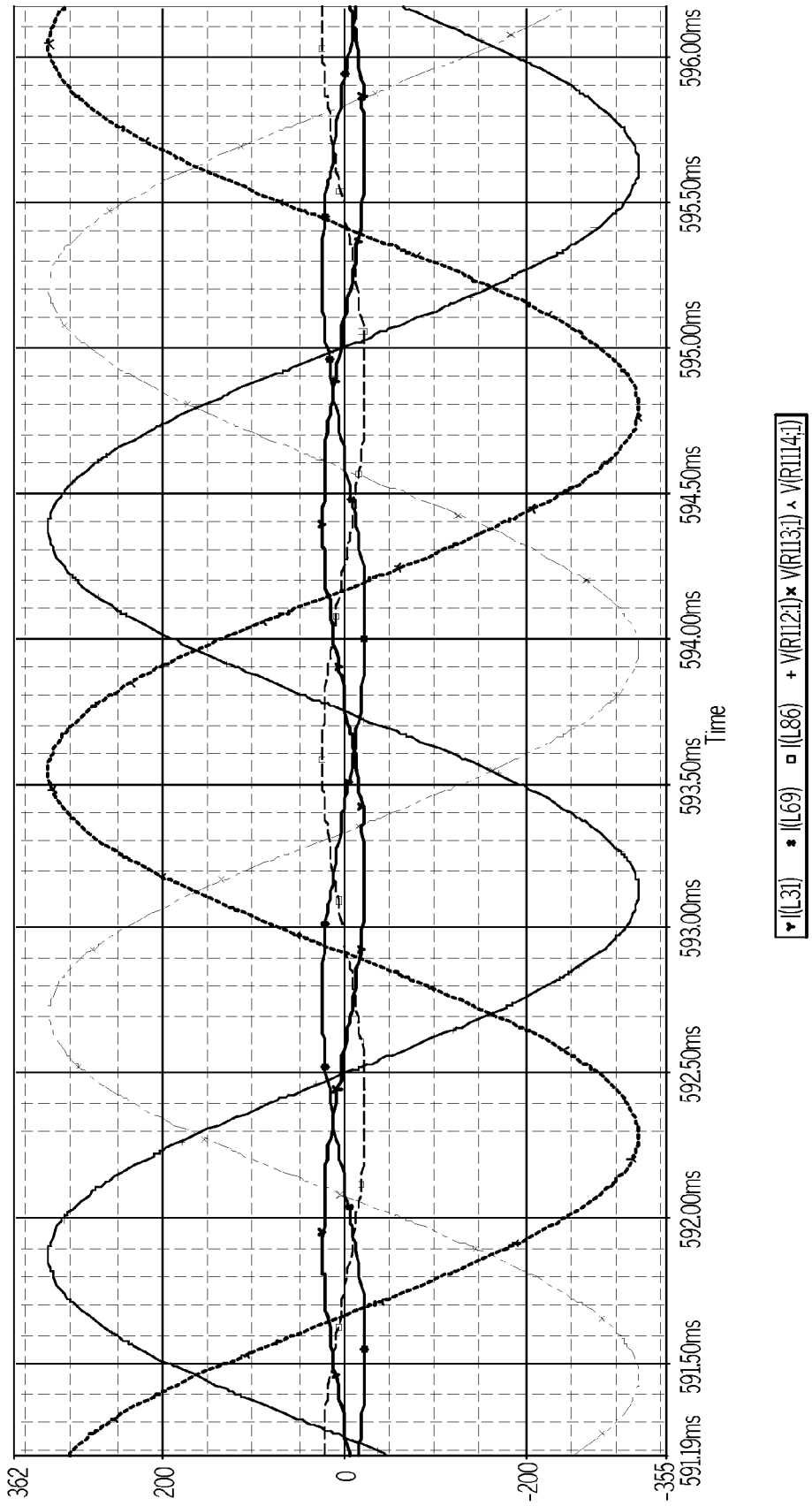
FIG. 4 is a graph showing the input voltage and current waveforms used in the simulation of FIG. 2.

The source voltages and currents may show nearly unity power factor. Like all rectifier systems, the power factor will depend on additional input filters and system loading, as shown in FIG. 4.

Figure 5:
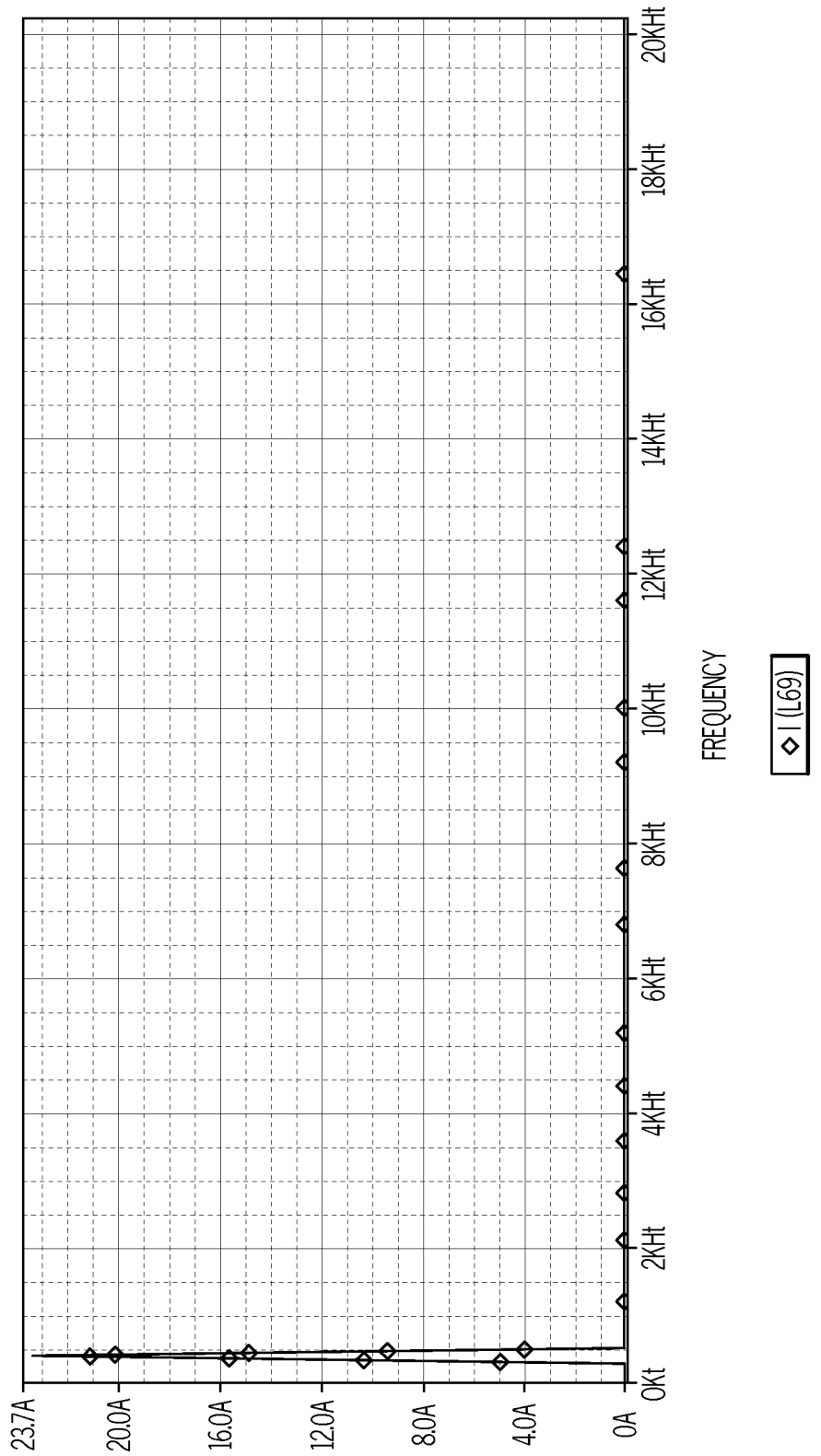
FIG. 5 is a graph showing a Fast-Fourier Transform (FFT) of the current input waveform (400 Hz fundamental) of FIG. 4.

FIG. 5 is a Fast-Fourier Transform (FFT) of the current waveform (400 Hz fundamental). Very small harmonics of the input current can be seen in FIG. 5.

Figure 6:
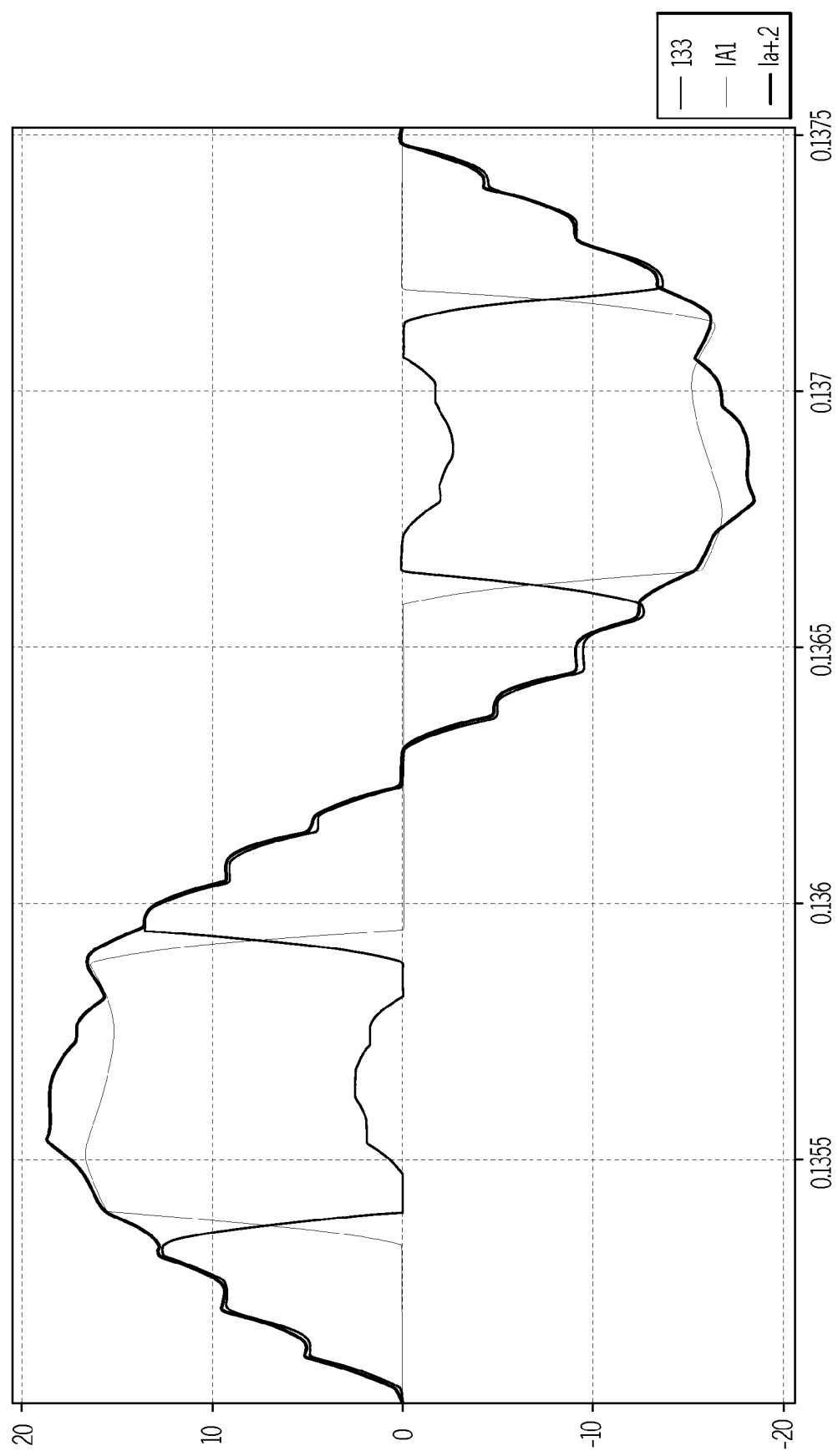
FIG. 6 is a graph showing the total input current and the current to the autotransformer during the simulation of FIG. 2.

As seen in FIG. 6, the input phase current that is directed to the auto transformer may be a fraction of the total current. An input phase current is the sum of two currents, one going to the transformer and the other to the main rectifier. The significance of this aspect of the present invention is that the autotransformer may have less loss than one that carries all the input phase current. For a 24-pulse system, the RMS current into the autotransformer may be about 50 percent of the phase current total.

Rectifier current contributions to a 9 kW resistive load demonstrate the current division between main and auxiliary rectifiers within the composite AC/DC converter. Because the auxiliary rectifiers may experience lower RMS current, with respect to the main rectifier, they may be smaller devices than those used for the main rectifier.

It can be correctly assumed that the construction of an 18-pulse transformer is simpler and smaller than a 24-pulse transformer of the same power; however, the system phase current harmonics using the 18-pulse transformer may be larger. U.S. Pat. No. 6,396,723, "Rectifier and Transformer Thereof" describes 12-pulse and 18-pulse transformers constructed with two or less equally spaced rays drawn from the vertices of an equilateral triangle. The intersection points of these rays with the arc are used to design the autotransformer windings voltage ratios and interconnections. However, by shifting the location of ray construction point to the midpoint of the same equilateral triangle, a different transformer is determined that has some benefit when compared to U.S. Pat. No. 6,396,723. These "midpoint" autotransformer benefits can be illustrated with simulations that show an increased amount of current bypassed to the main rectifier along with the reduction of the 5$^{th}$ harmonic current component in the phase waveforms. The 5$^{th}$ harmonic is the lowest frequency present in these current waveforms and, as such, if required to be further reduced, will need a larger filter.

Figure 7:
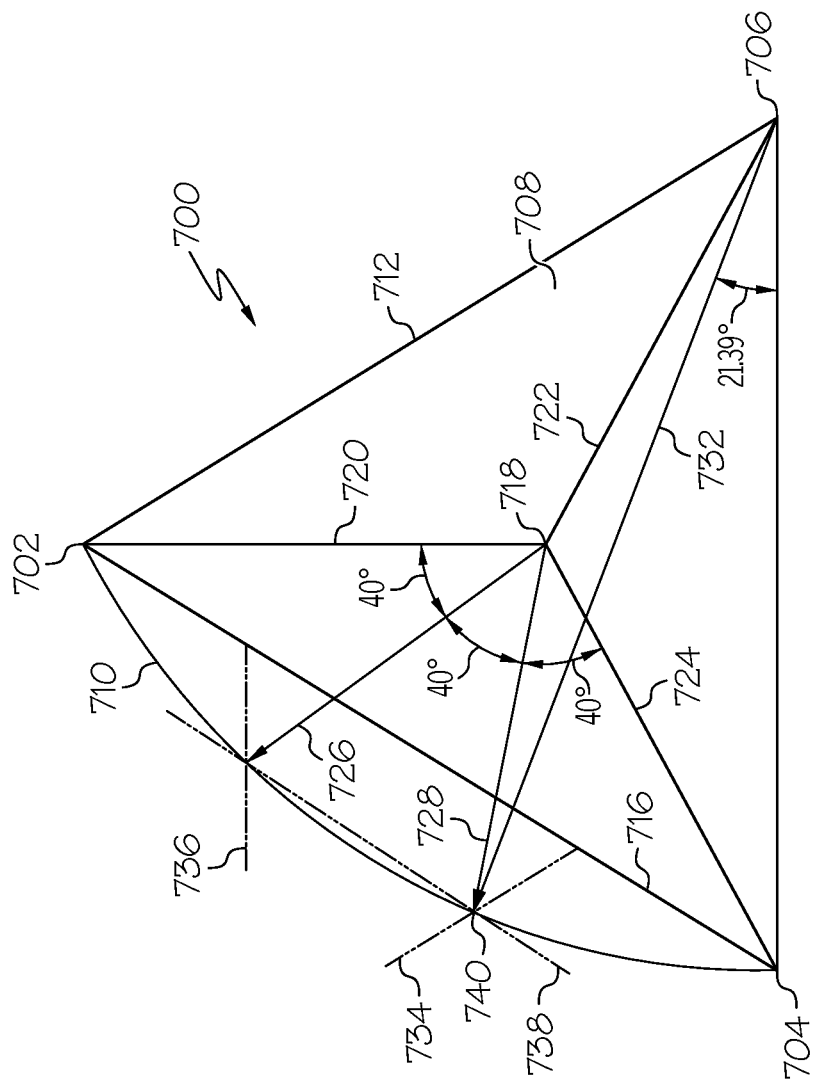
FIG. 7 is one leg of a construction diagram for an 18-pulse autotransformer according to an embodiment of the present invention.

One leg of the construction diagram for the proposed midpoint 18-pulse autotransformer is shown in FIG. 7. The midpoint 18-pulse autotransformers used in the composite systems of the present invention satisfy a transformer diagram 700 constructed using the vertices 702, 704 and 706 of an equilateral-triangle 708 and an arc 710 swung between them equal to the length of one of the triangle's legs. A midpoint 718 of the triangle 708 may be established at a point that is an intersection of three lines 720, 722 and 724 which bisect angles at the vertices 702, 704 and 706 of the triangle 708. In the case of describing an 18 pulse autotransformer, two rays 726 and 728 may be drawn connecting the midpoint 718 and the arc 710 at equally spaced angles. Since the angle between lines 720 and 724 is 120°, the rays 726 and 728 may be spaced at 40° angles from one another. (For purposes of simplicity, the arc and rays are described for only one leg 716 of the triangle 708. Additional arcs and rays may be implied for the other legs 712 and 714 of the triangle 708). The intersection points of these rays with the arc may be used to design the autotransformer's windings voltage ratios and interconnections using various line segments resulting from intersections of the arc 710, the leg 716 and construction lines 734, 736 and 738 drawn parallel to the triangle's legs. An autotransformer designed this way may have output voltages of lower amplitude than the voltage source, while the voltage source amplitude alone fixes the DC output level of the system. For example, a ratio of a length of the ray 730 and a length of line 732 drawn from the midpoint 718 to the intersection point 740 may be employed to establish an autotransformer auxiliary to primary phase voltage ratio of 0.7583. Because of the voltage and phase differences, the load current splits into two paths. This midpoint autotransformer construction may determine winding turn ratios that differ from the U.S. Pat. No. 6,396,723 autotransformer of similar topology by as much as 20 percent.

Figure 8:
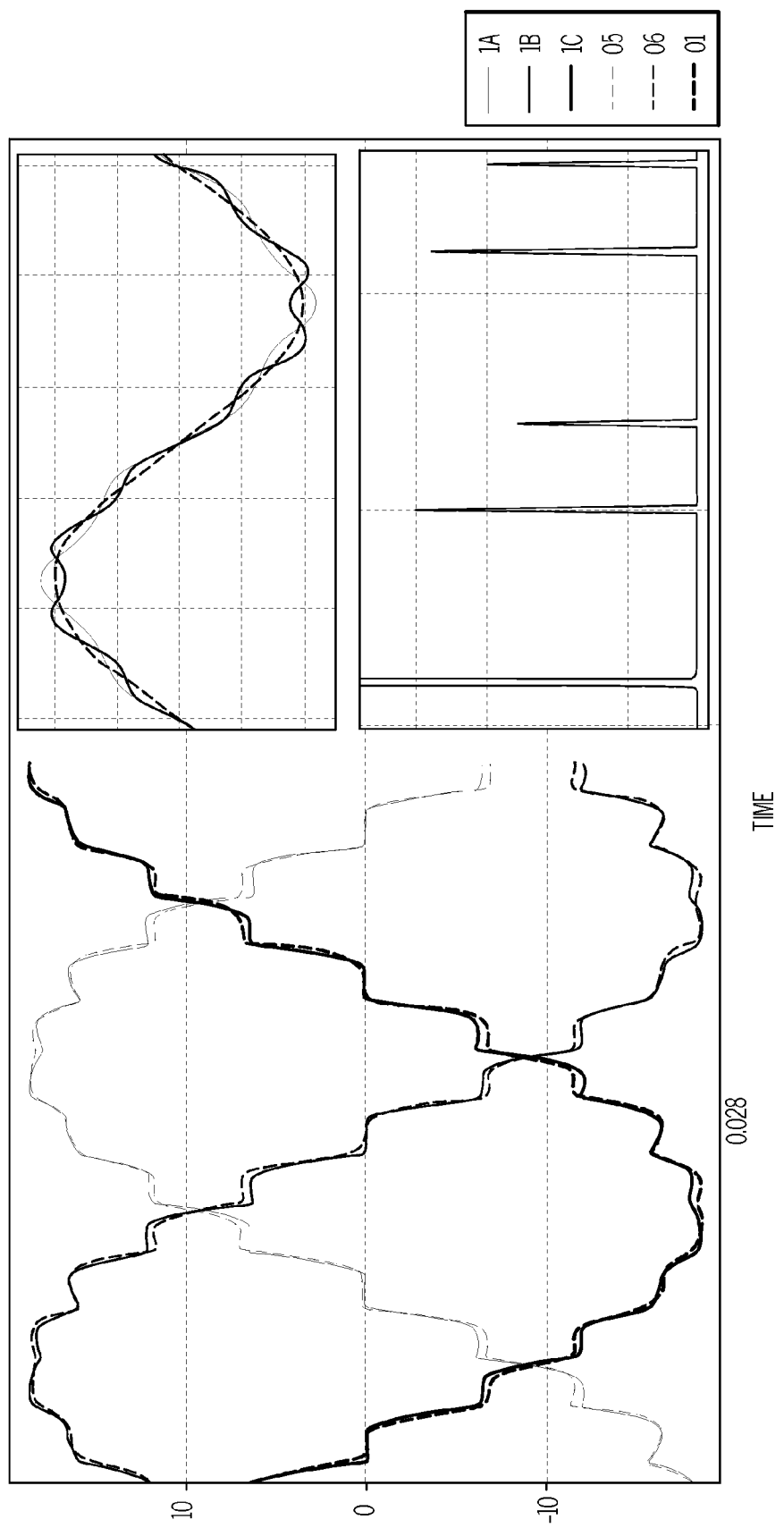
FIG. 8 is a graph showing phase current waveforms for comparison of 18-pulse composite autotransformer types.

A simulation of the midpoint 18-pulse AC-to-DC converter along with a vertex 18-pulse AC-to-DC showing the phase currents is given in FIG. 8. Both systems are simulated as supplying 9-kW resistive loads.

There is some performance loss with a midpoint autotransformer construction. Although the $5^{th}$ harmonic is reduced, using the midpoint autotransformer construction compared to the vertex type construction, the $9^{th}$ and $11^{th}$ harmonics increase. These higher harmonics, if required to be further reduced, will need a relatively smaller filter (as compared to the filter needed to reduce the $5^{th}$ harmonic). The ACR parameter for the 18-pulse midpoint autotransformer is 3.85 compared to the vertex autotransformer's ACR of 3.9.

Figure 9:
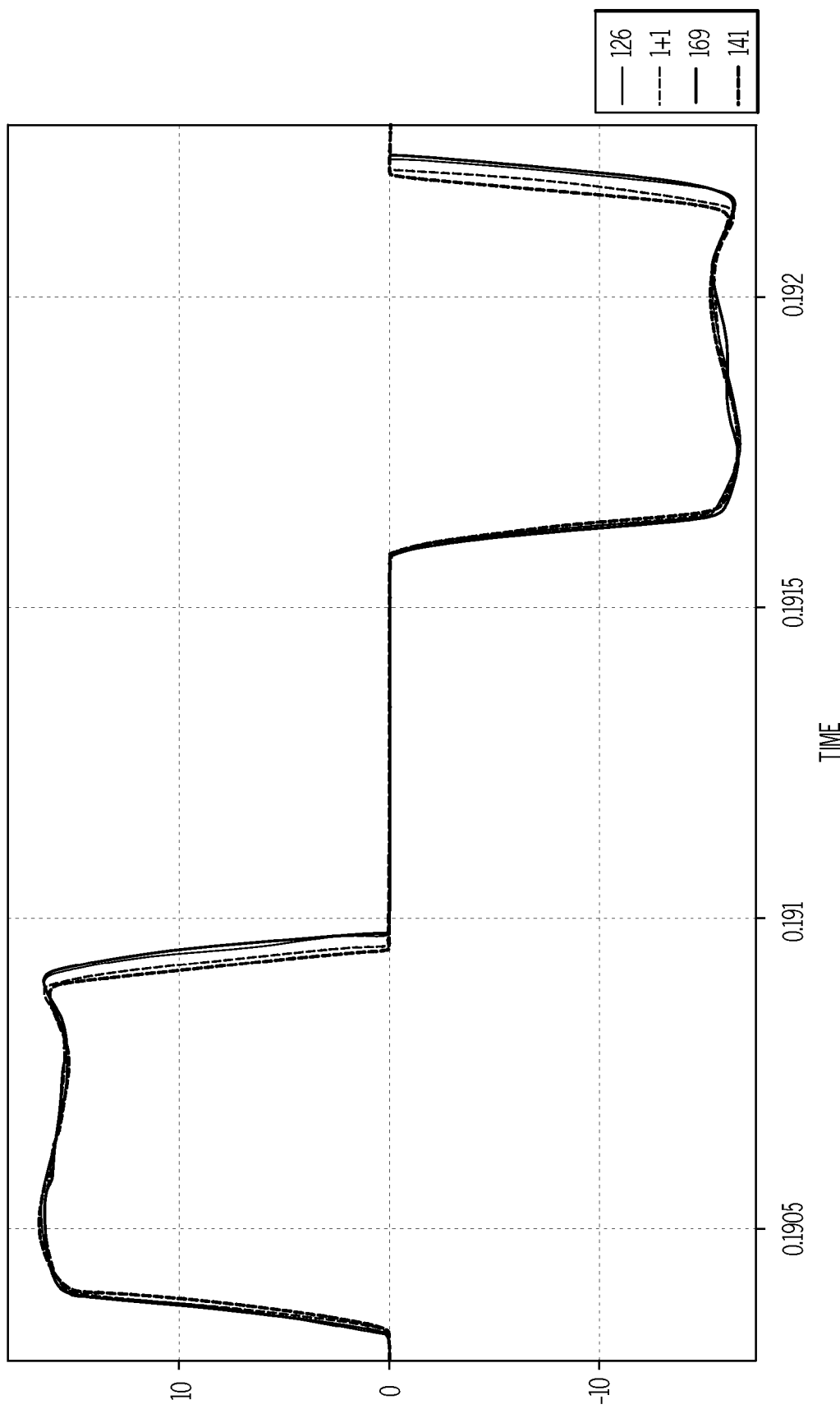
FIG. 9 is a graph showing currents to the main rectifiers for comparison of composite autotransformer types.

More input current may be bypassed around the midpoint-constructed autotransformer compared to a vertex-constructed one. A midpoint 18-pulse-type composite autotransformer system bypasses an additional 0.55 to 0.67 percent of the RMS input current directly to the main rectifier, as shown in FIG. 9. This is due to the differences in the constructor ray angles used for the midpoint autotransformer design. The benefit of bypassing more current around the autotransformer is that it gives a slight increase in system AC/DC conversion efficiency.

Figure 10:
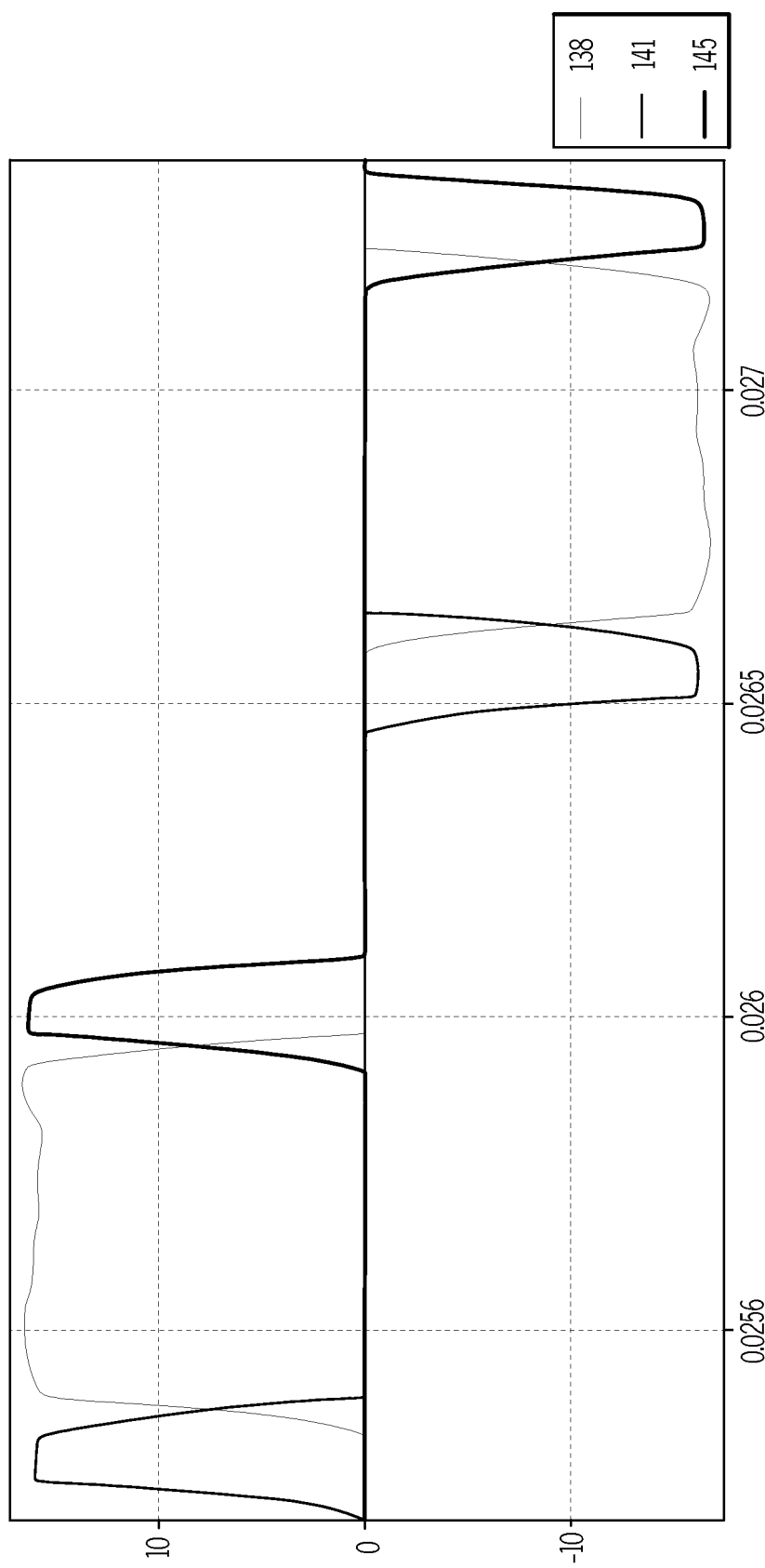
FIG. 10 is a graph showing current waveforms of all rectifier outputs for an 18-pulse composite autotransformer.

Rectifier current contributions to a 9-kW resistive load demonstrate the current division between main and auxiliary rectifiers within the composite AC/DC converter. Because the auxiliary rectifiers experience lower RMS current, with respect to the main rectifier, they may be smaller devices than those used for the main rectifier (see FIG. 10).

Figure 11:
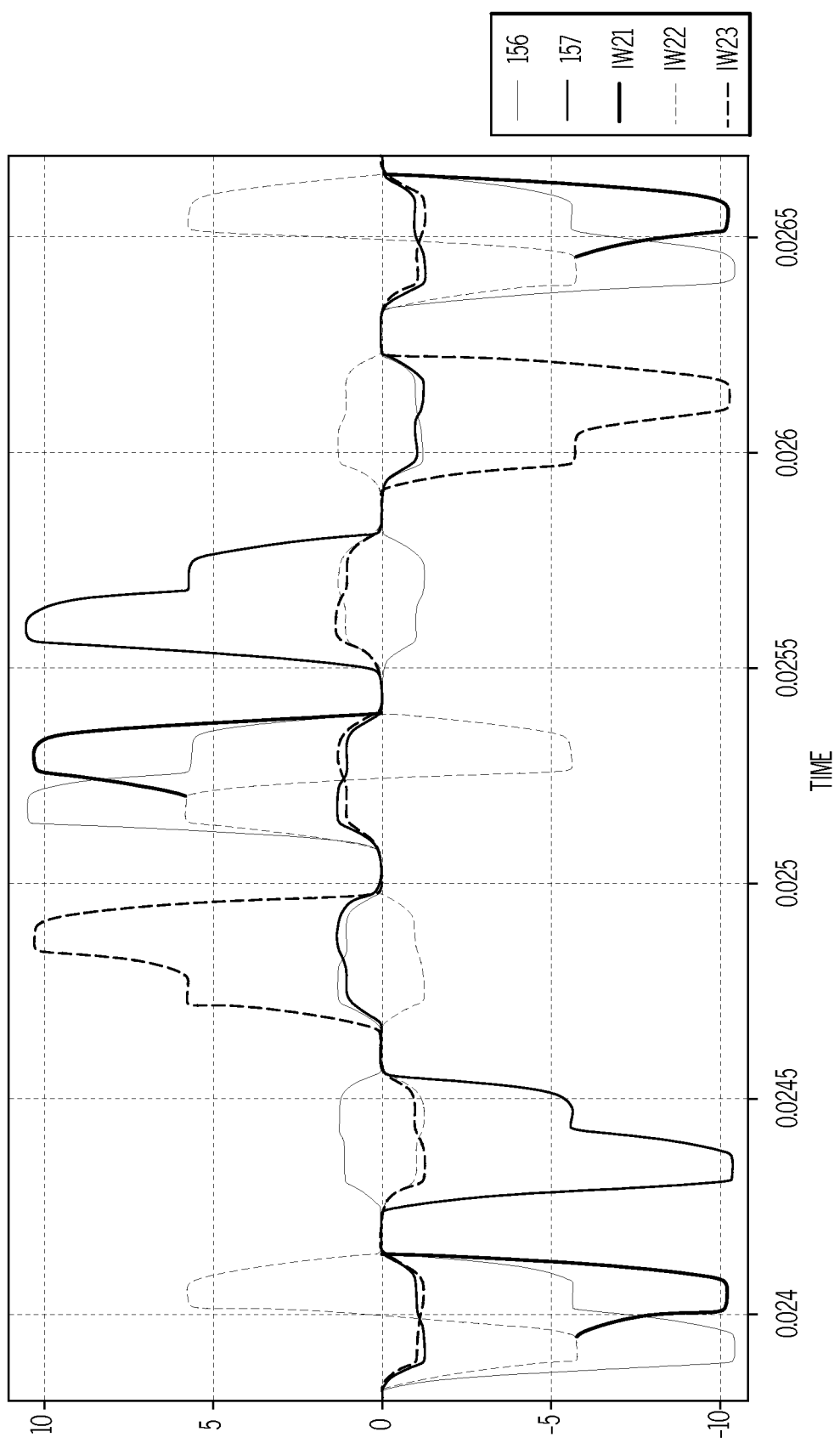
FIG. 11 is a graph showing currents within windings of one autotransformer leg for an 18-pulse composite autotransformer.

The various currents within five windings, for slightly more than one cycle of the input fundamental, are shown in FIG. 11 for one 18-pulse composite autotransformer leg. They contain essentially three different RMS values.

Figure 12:
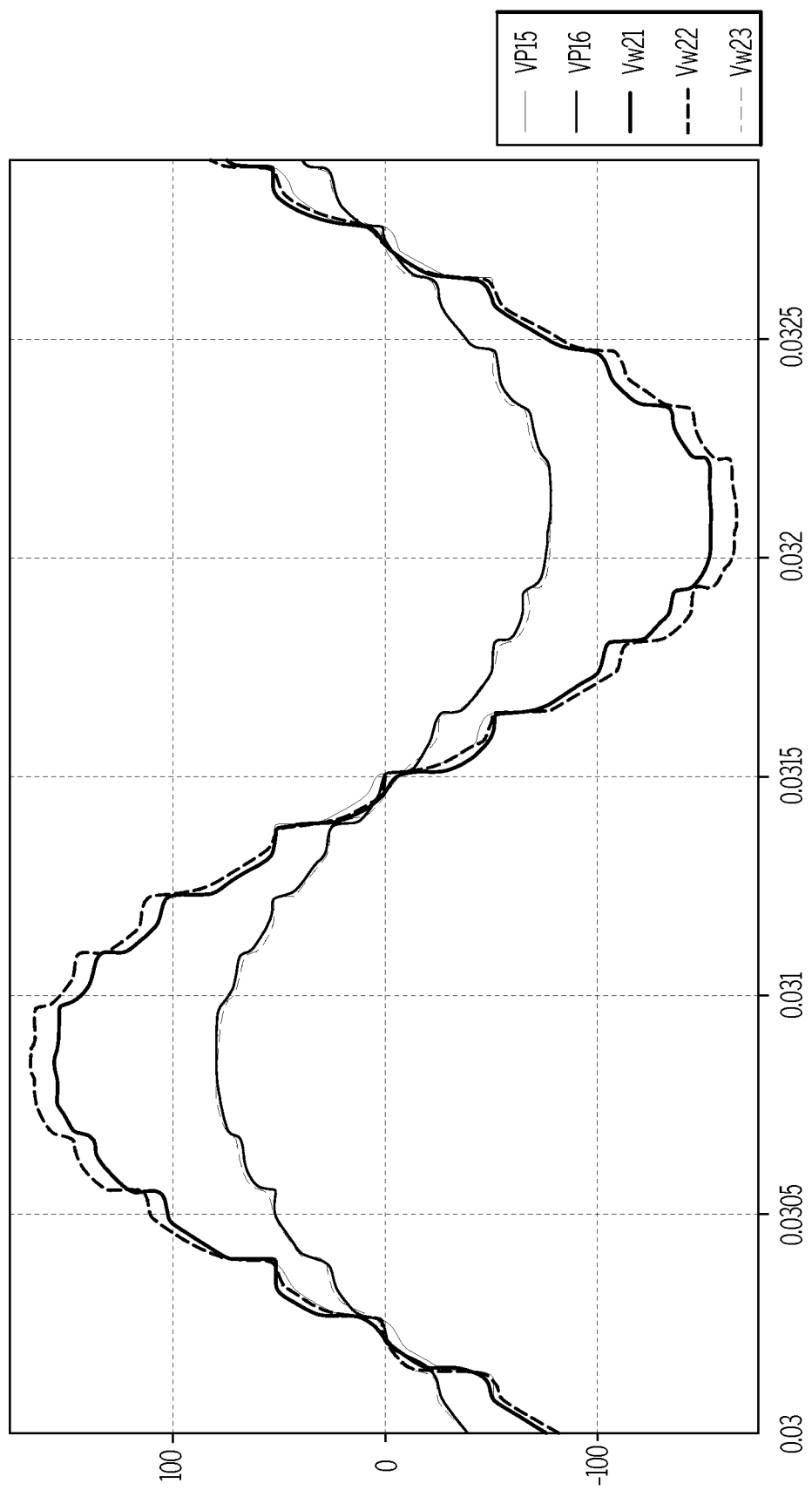
FIG. 12 is a graph showing voltages within windings of one autotransformer leg for an 18-pulse composite autotransformer.

The voltage across the five windings of one 18-pulse composite autotransformer leg is shown in FIG. 12. There are three different RMS values essentially based on the designed composite autotransformer turn ratios.

The methods of the present invention for composite AC-to-DC midpoint power conversion may present some or all of the following advantages:

The ACR of this conversion method is potentially 42 percent of those calculated from other present ATRU methods. This may lead to a factor of two reduction in weight of the AC-to-DC conversion.

The voltage drop across the converter is very low. It is slightly higher than the voltage drop of two forward-biased diodes, which is typically a few volts.

The output impedance of the converter is very low compared to the conventional ATRU that results in a robust power source.

The output voltage is almost independent of the load current. The variation is expected to be less than one volt. The low variation of the output voltage allows optimization of the DC-to-AC conversion from performance and corona perspectives.

During transient input voltages, the converter would act in a stable manner.

During transient output loads, the converter would act in a stable manners.

The efficiency may be very high since a large part of the power flows through the main six-pulse rectifier.

Except for input filters and line losses, there may be no variable voltage droop into the system as a result of frequency variation. This is due to the dominating role of main the six-phase rectifier, which has very few frequency-dependent elements.

Reduced size and weight because a large portion of the power may be converted by a simple six-pulse rectifier.

Additional inductors at the input of the converter may not be required.

EMI control will be easier by using smaller components due to a smoother current wave shape and higher diode frequency commutation.

The electric drive may operate in a more optimized mode due to reduced DC voltage variation. This is in line with the latest MEA tendency for energy-optimized aircraft.

The new method may be easily used in retrofit applications because it presents reduced volume, weight, and losses.

Although applications of this AC-to-DC composite converter are considered to be for power systems less than 25 kW, the system is not inherently power limited.

It should be understood, of course, that the foregoing relates to exemplary embodiments of the invention and that modifications may be made without departing from the spirit and scope of the invention as set forth in the following claims.

We claim:

1. A composite AC-to-DC converter comprising:
a main rectifier receiving at least a portion of an input AC waveform;
an autotransformer comprising sets of three phase outputs and having output voltages with lower amplitude than the input AC waveform; and
a plurality of auxiliary bridge rectifiers, each receiving the output from each leg of the autotransformer, each being generally smaller than the main rectifier, wherein
each output from each leg of the autotransformer is connected in parallel with an output of the main rectifier, and each leg of the autotransformer satisfies a transformer vector diagram constructed using vertices of an equilateral triangle;
   wherein an arc swung between the vertices has a radius equal to a length of one leg of the triangle,
   wherein rays are drawn from a midpoint of the equilateral triangle,
   wherein construction lines are drawn through intersection points of these rays with the arc, and
   wherein at least one of the construction lines is drawn parallel to each leg of the triangle.

2. The composite AC-to-DC converter according to claim 1 wherein the input AC waveform is split with a portion of load current being rectified through the main rectifier and the remaining portion of load current flowing through the autotransformer to be rectified by the auxiliary bridge rectifiers.

3. The composite AC-to-DC converter according to claim 1, wherein the output of the AC-to-DC converter results in very small harmonics to the input current.

4. A method for converting AC power to DC power with an 18-pulse AC-to-DC converter, the method comprising:
   passing a first portion of a load current through a main rectifier;
   passing a second portion of a load current though an autotransformer, the autotransformer having output voltages with lower amplitude than an input AC waveform; and
   rectifying the output from the autotransformer with a plurality of auxiliary bridge rectifiers, each of the auxiliary bridge rectifiers receiving the output from each leg of the autotransformer, wherein
   outputs of the auxiliary bridge rectifiers are connected in parallel to an output of the main rectifier, and
   each leg of the autotransformer satisfies a transformer vector diagram constructed using vertices of an equilateral triangle:
     wherein an arc swung between the vertices is has a radius equal to a length of one leg of the triangle,
     wherein two rays are drawn from a midpoint of the equilateral triangle,
     wherein the rays that are equally spaced between two equilateral legs of the triangle and each ray extends from the opposite vertex to a point along the arc,
     wherein construction lines are drawn through intersection points of the rays with the arc, and
     wherein at least one of the construction lines is drawn parallel to each leg of the triangle.

5. The method of claim 4, further comprising minimizing loss from the autotransformer by providing, to the autotransformer, the second portion which is a fraction of the total AC input.

6. The method of claim 5, wherein the first portion is a substantial portion of the load current and the second portion is the remaining portion of the load current.

7. The method of claim 6, wherein each of the auxiliary bridge rectifiers are smaller than the main rectifier.

8. A method for reducing the total harmonic distortion (THD) of an 18-pulse AC-to-DC converter, the method comprising:
   passing a portion of a load current through a main rectifier;
   passing the remaining portion of a load current through an autotransformer, the autotransformer having voltage ratios and interconnections of windings determined in a vector diagram comprising an equilateral triangle:
     wherein an arc is swung between two vertices,
     wherein the rays are equally spaced between two equilateral legs,
     wherein each ray extends from a midpoint of the equilateral triangle to a point along the arc, and
     wherein the autotransformer has an output voltage with lower amplitude than an input AC waveform; and
   rectifying the output from the autotransformer with a plurality of auxiliary bridge rectifiers, each of the auxiliary bridge rectifiers receiving the output from each leg of the autotransformers, and each of the auxiliary bridge rectifiers are smaller than the main rectifier.

9. The method of claim 8, wherein the output of the 18-pulse AC-to-DC converter results in very small harmonics to the input current.

* * * * *